United States Patent
Tate et al.

(10) Patent No.: US 6,400,803 B1
(45) Date of Patent: Jun. 4, 2002

(54) VOICE OVER DIGITAL SUBSCRIBER LINE CALL REDIRECTION FOR LIFELINE SERVICE

(75) Inventors: Christopher N Tate, Bishop's Stortford; Jonathan Beattie, Harlow; Roger J Williamson, Much Hadham; Igor K Czajkowski, Bishop's Stortford; Mark Bridger, Hertford Heath, all of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/375,709

(22) Filed: Aug. 17, 1999

(51) Int. Cl.[7] .................................................. H04M 1/24
(52) U.S. Cl. ...................... 379/27.06; 379/1.01; 379/2; 379/9.05; 379/32.01; 379/33
(58) Field of Search ................................. 379/1, 27–28, 379/34, 156, 157, 322, 377, 379, 387, 2, 8, 9, 10, 15, 23–24, 32

(56) References Cited

U.S. PATENT DOCUMENTS

| | | | | |
|---|---|---|---|---|
| 4,575,584 A | * | 3/1986 | Smith et al. | 379/156 |
| 5,142,571 A | * | 8/1992 | Suzuki et al. | 379/279 |
| 5,220,597 A | * | 6/1993 | Horiuchi | 379/362 |
| 5,220,599 A | * | 6/1993 | Sasano et al. | 379/142 |
| 5,317,631 A | * | 5/1994 | Chen | 379/164 |
| 5,581,612 A | * | 12/1996 | Nishikawa | 379/387 |
| 5,596,631 A | * | 1/1997 | Chen | 379/177 |
| 5,764,755 A | * | 6/1998 | Chen | 379/399 |
| 5,883,941 A | | 3/1999 | Akers | 379/93.08 |
| 5,912,957 A | * | 6/1999 | Park | 379/165 |
| 6,141,356 A | * | 10/2000 | Gorman | 370/493 |
| 6,272,209 B1 | * | 8/2001 | Bridger et al. | 379/27 |

FOREIGN PATENT DOCUMENTS

| | | |
|---|---|---|
| EP | 0 917 392 | 5/1999 |
| EP | 0 930 800 | 7/1999 |

* cited by examiner

*Primary Examiner*—Binh Tieu
(74) *Attorney, Agent, or Firm*—Lee, Mann, Smith, McWilliams, Sweeney and Ohlson

(57) ABSTRACT

Customer premises equipment for a telecommunications DSL subscriber is adapted to provide a lifeline voice service under a fault condition, e.g. a power failure at the subscriber station. The arrangement incorporates a number of switchable local subscriber ports each providing access to a respective telephone instrument, and a router circuit whereby, under normal conditions, voice calls may be routed each to a respective loop port. Under a fault condition the router directs an incoming call to a selected port to provide the lifeline service. Further calls may be barred when such a lifeline call is in progress.

12 Claims, 6 Drawing Sheets

VOICE OVER DIGITAL SUBSCRIBER LINE CALL REDIRECTION FOR LIFELINE SERVICE

FIELD OF THE INVENTION

The present invention relates to a method and apparatus for lifeline call redirection in a voice over digital subscriber line system, and a system incorporating the same.

BACKGROUND TO THE INVENTION

Digital Subscriber Line (DSL) modem technology has enabled the transmission of digital information at duplex rates from 144 Kbits/s to over 1 Mbits/s over the subscriber loop. The demand for additional telephone lines and integrated telephony and data services has given rise to Voice over DSL (VoDSL) solutions. For example a VoDSL system may provide 4 voice channels carried within the digital data over a single twisted pair subscriber loop from a Line Terminating Equipment (LTE) located in the Central Office to a Customer Premises Equipment (CPE). In one implementation a VoDSL system carries the voice channel(s) in band as encoded data within the data stream and therefore there is no baseband POTS (Plain Old Telephony Service) as would be the case with for example ADSL or G.Lite. Unlike normal telephony the derived voice method of VoDSL requires local power at the CPE to perform the modulation and demodulation.

Conventional analogue POTS telephony over a twisted pair to the LTE has the benefit that during power failure at the customer premises emergency calls can still be placed since the line and the handset at the customer premises are powered from the central office. A disadvantage of existing VoDSL modems is that the amount of power required for normal operation could severely limit the operational loop length if power is fed from the central office and not provide a service able to reach the majority of consumers. This has limited deployment of VoDSL systems to subscribers having an additional conventional POTS line which can be used in the event of power failure. Absence of support for lifeline services has therefore severely hindered deployment into the small business and especially the residential market.

In a voice over DSL system where a number of derived telephone ports are supported, in-band, over a single physical copper pair, it may be required to provide a "lifeline" service. This is a condition to which the system reverts in the case of CPE power failure, modem failure etc. consequently, this would then provide normal telephony service and in particular access to emergency services. Under such conditions it may only be feasible to support a single "lifeline" telephone port on the CPE modem (due to power feed constraints, battery provision etc). This would therefore result in a number of the derived telephone ports being unavailable for service.

Reference is here directed to our co-pending application Ser. No. 09/305,943 which relates to a filter arrangement for a telephone subscribers installation providing access to a plurality of telephone instruments.

OBJECT OF THE INVENTION

The invention seeks to provide an improved method and apparatus for providing lifeline call support in a voice over digital subscriber loop system.

SUMMARY OF THE INVENTION

According to a first aspect of the invention, there is provided customer premises equipment arrangement for a telecommunications subscriber, the arrangement comprising a subscriber loop port; a plurality of switchable local subscriber ports; and a router circuit; wherein each of said plurality of local subscriber ports is switchably connectable in parallel to said subscriber loop port and wherein said router is arranged to monitor signals received at said subscriber loop port and to selectively disconnect at least one of said local subscriber ports responsive to said signals.

According to another aspect of the invention, there is provided customer premises equipment arrangement for a telecommunications subscriber and adapted to provide a lifeline voice service under a fault condition, the arrangement comprising a subscriber loop port whereby the arrangement is coupled to the subscriber loop; a plurality of switchable local subscriber ports each providing access to a respective telephone instrument; and a router circuit whereby, under normal conditions, voice calls may be routed each to a respective loop port; wherein each of said plurality of local subscriber ports is switchably connectable in parallel to said subscriber loop port and wherein said router is arranged to monitor signals received at said subscriber loop port and to selectively provide and maintain voice access to one said loop port under a said fault condition.

The invention is also directed to a method by which the described apparatus operates and including method steps for carrying out every function of the apparatus.

According to a further aspect of the invention, there is provided a method of operating a customer premises equipment arrangement comprising a subscriber loop port and a plurality of local subscriber ports selectively connectable to said subscriber loop port; the method comprising the steps of: receiving signal at said subscriber loop port indicative of a local port; and selectively coupling one of said local subscriber ports to said subscriber loop port responsive to said signal.

According to a further aspect of the invention, there is provided a method of operating a customer premises equipment arrangement comprising a subscriber loop port coupled with a subscriber loop to a line termination equipment and having a plurality of local subscriber ports each connectable to a telephone instrument so as to provide a voice over digital subscriber line service to each said telephone instrument, the method comprising routing incoming voice calls each to a respective local point determined from signalling associated with that call, and, under a fault condition in each customer premises equipment arrangement, routing an incoming voice call to a selected one of said local ports and inhibiting further incoming calls while that call is in progress.

The invention also provides for a system for the purposes of digital signal processing which comprises one or more instances of apparatus embodying the present invention, together with other additional apparatus.

The subscriber equipment described below operates, during power fail or modem failure at the CPE, so as to automatically map any incoming telephone calls to a CPE system to the designated "lifeline" POTS 'phone port. In this way, an external incoming call to any of the derived telephone ports at the CPE will be terminated at the designated "lifeline" POTS port. It is assumed that the installation will be such that the "lifeline" telephone (or telephones on extension) will be known and physically accessible by all users (such as a small office environment).

During "lifeline" operation all external telephone calls to any of the logical ports on a given VoDSL CPE are terminated at the designated "lifeline" telephone. Preferably, only one incoming call at once to a given VoDSL CPE is supported during "lifeline" operation, others are treated by the LE as unavailable or engaged.

Automatic redirection of all in-band telephony channels to one "lifeline" telephone port may be effected and blocking of incoming calls to non-lifeline logical telephony ports due to VoDSL "lifeline" invocation is eliminated.

The LE is signalled during "lifeline" invocation and repeal to indicate VoDSL "lifeline" status.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF PREFERRED EMBODIMENTS

Figure 1:
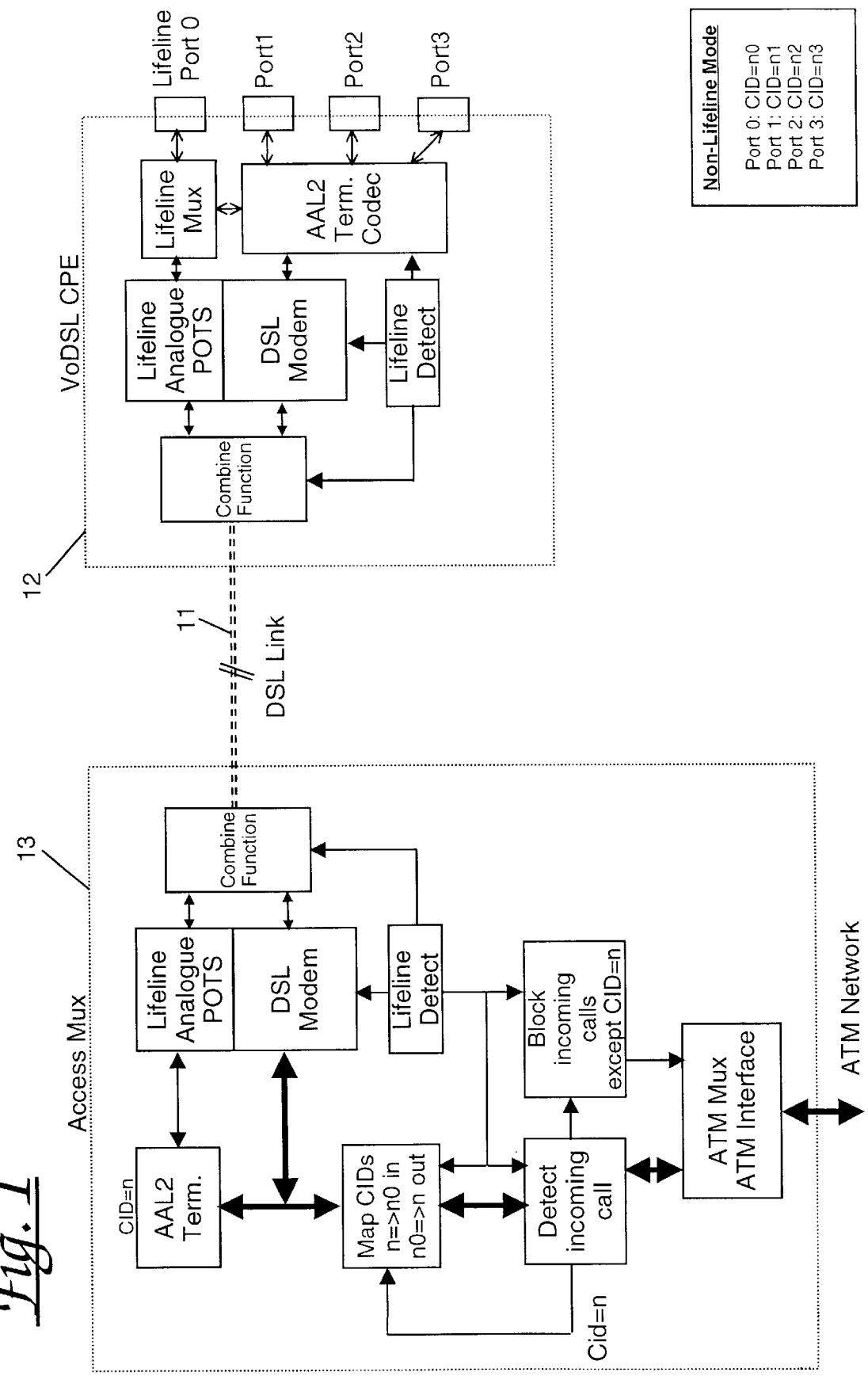
FIG. 1 shows a first embodiment of a system in accordance with the present invention.

Referring first to FIG. 1, this depicts a first preferred exemplary embodiment in which DSL communication is provided over a subscriber line 11 between customer premises equipment (CPE) 12 and a line termination equipment or access multiplexer 13. The CPE delivers services including voice services via a number of ports, and also incorporates a 'lifeline' port whereby a voice service is maintained to the subscriber in the event of a power failure at the CPE.

In the exemplary embodiment shown schematically in FIG. 1, the voice and signalling information is carried over ATM with the individual voice traffic channels being carried as ALL2 mini-cells with identifying CIDs. The mapping is then performed by terminating the signalling within the access MUX and translating the CID of the incoming voice channel to the CID of the "lifeline" traffic channel (and vice-versa for outgoing mini-cells). The CPE equipment will then behave in the same fashion no matter which of its logical 'phones are called. The correct termination of the signalling is crucial to the desired operation. The access MUX must signal back to the Local Exchange (LE) to ensure that the call is set up as normal (provided that the "lifeline" 'phone is not engaged) and to ensure that the remaining logical 'phones are made unavailable or engaged. Entry to and exit from "lifeline" mode is controlled is and appropriately signalled to the LE. Entry into "lifeline" mode is likely to be forced and any existing calls dropped. It is also desirable that "lifeline" mode will only be exited when the CPE "lifeline" 'phone port has an on-hook status—this prevents any in-progress call (possible an emergency) from being interrupted.

Figure 2:
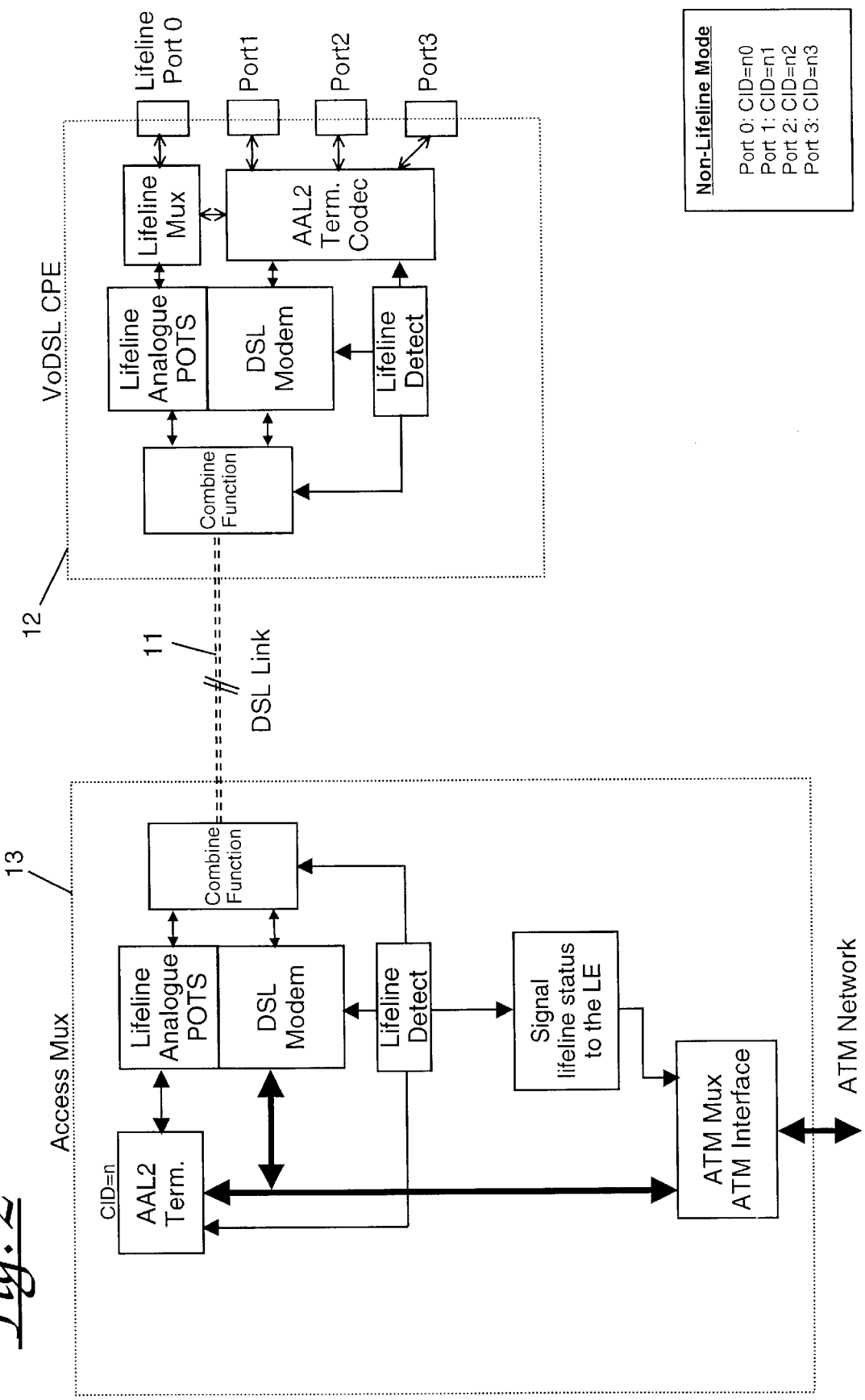
FIG. 2 shows a second embodiment of a system in accordance with the present invention.

A second preferred exemplary embodiment, shown schematically in FIG. 2, involves the CPE signalling to the LE that "lifeline" service has been invoked for a particular CPE. The LE must then perform the mapping/call diversion of any incoming call to the "lifeline" 'phone number and again force the non-lifeline 'phones to be unavailable or engaged. As in the first preferred example, entry and exit from "lifeline" mode should be carefully controlled in the same way.

Voice over DSL (VoDSL) is a means of supplying a number of derived POTS circuits along with data over a single copper loop. These POTS circuits will present themselves as conventional interfaces for direct connection to a standard telephone. There is a requirement to ensure the use of at least one telephone in the event of an emergency for lifeline. The method of provisioning for lifeline POTS is to use an analogue POTs capable linecard at the Central Office end of the loop, which would detect that loss of the DSL link by some means and switch the line over to the lifeline analogue linecard with its battery feed. At the CPE, the conventional analogue telephones are directly connected to the loop via some form of switching. This switching, possibly in the form of relays, should be such that, in their un-powered lifeline state, the direct connection is made, bypassing the modem.

These POTS circuits may not be co-located since they could be to separate apartments in a block. The arrangement provides a method of directing an incoming call to a particular phone.

Figure 3:
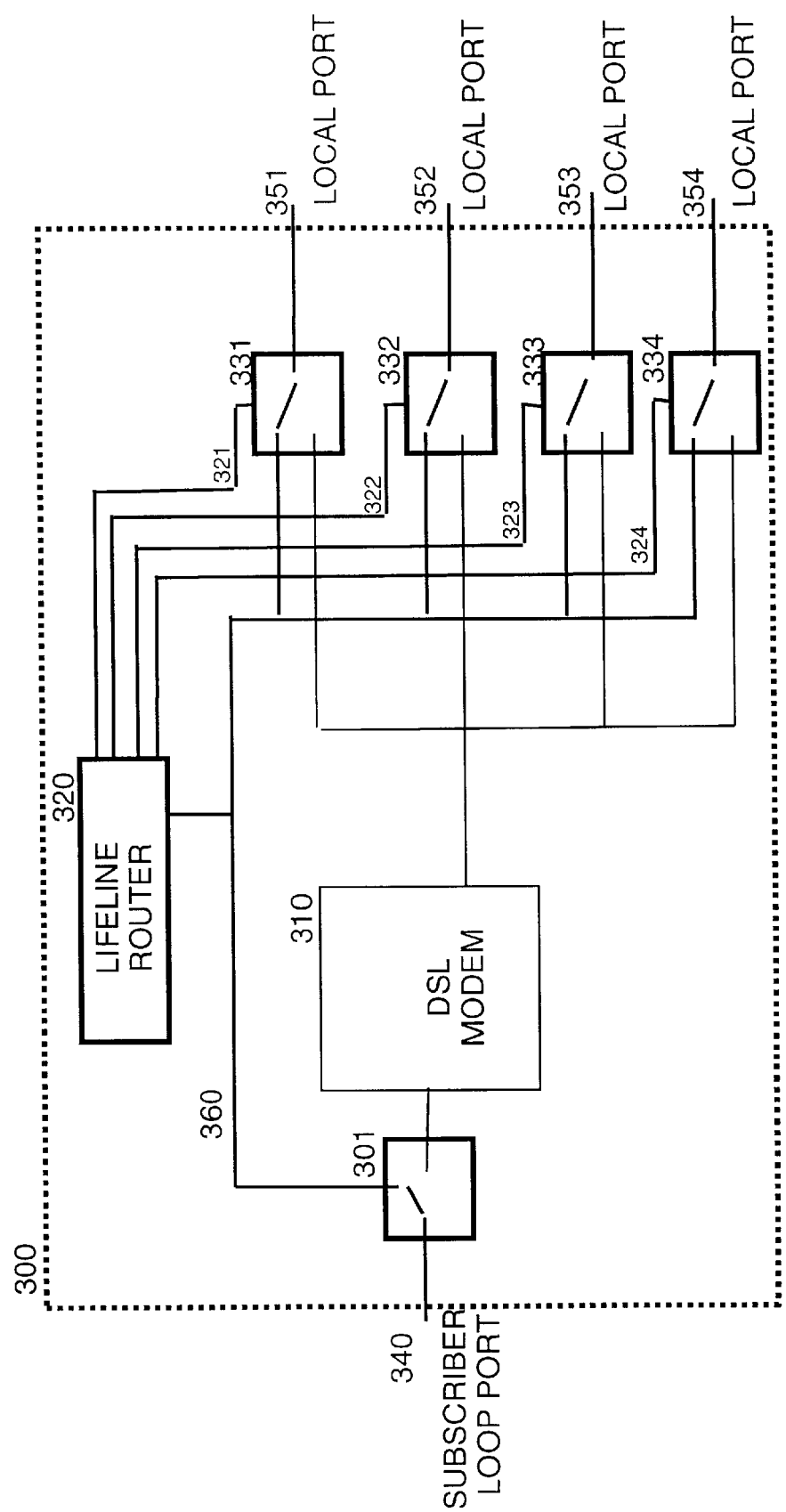
FIGS. 3 and 4 show two distinct states of customer premises equipment arrangement in accordance with the present invention.

Referring now to FIG. 3 an apparatus and method is described for routing an incoming call at the CPE to a particular POTS outlet when a DSL modem CPE arrangement is in lifeline mode.

The CPE 300 comprises four relays 301, 331–4, a DSL modem 310, and a lifeline router 320. It also comprises a subscriber loop port 340, and four local subscriber ports 351–4.

Subscriber loop port 340 is connected via switch 301 to the DSL modem 310 which in turn is connected to each of the four ports 351–4 via switches 331–4 respectively. The subscriber loop port is also connected via switch 301 by a direct connection to switches 331–4 to ports 351, 354 respectively. Lifeline router 320 is arranged to receive the signal passing between switch 301 and switches 331–4 and to provide as output signals on outputs 321–4 which provide control signals to switches 331–4 respectively.

In normal operation when local power is provided to the CPE 300 switch 301 connects between the subscriber loop port and the DSL modem 310 and similarly switches 331–4 are operated to provide direct connections from the DSL modem 310 to ports 351–4 respectively. Upon loss of local power the switches 301, 331–4 are arranged to default (as shown in FIG. 3) to provide a direct connection from the subscriber loop port 340 via the direct link to switches 331–4 and hence to local subscriber ports 351–4 respectively. In lifeline mode only one channel can be supported between the subscriber loop port and one of the local subscriber ports, and the normal mode functionality of the DSL modem is unavailable to direct incoming calls to the relevant port. In lifeline mode then the lifeline router 320 is used to receive redirection signals from the local exchange via the subscriber loop port 340 whereby to control switches 331–4 to provide local routing within the CPE.

Figure 4:
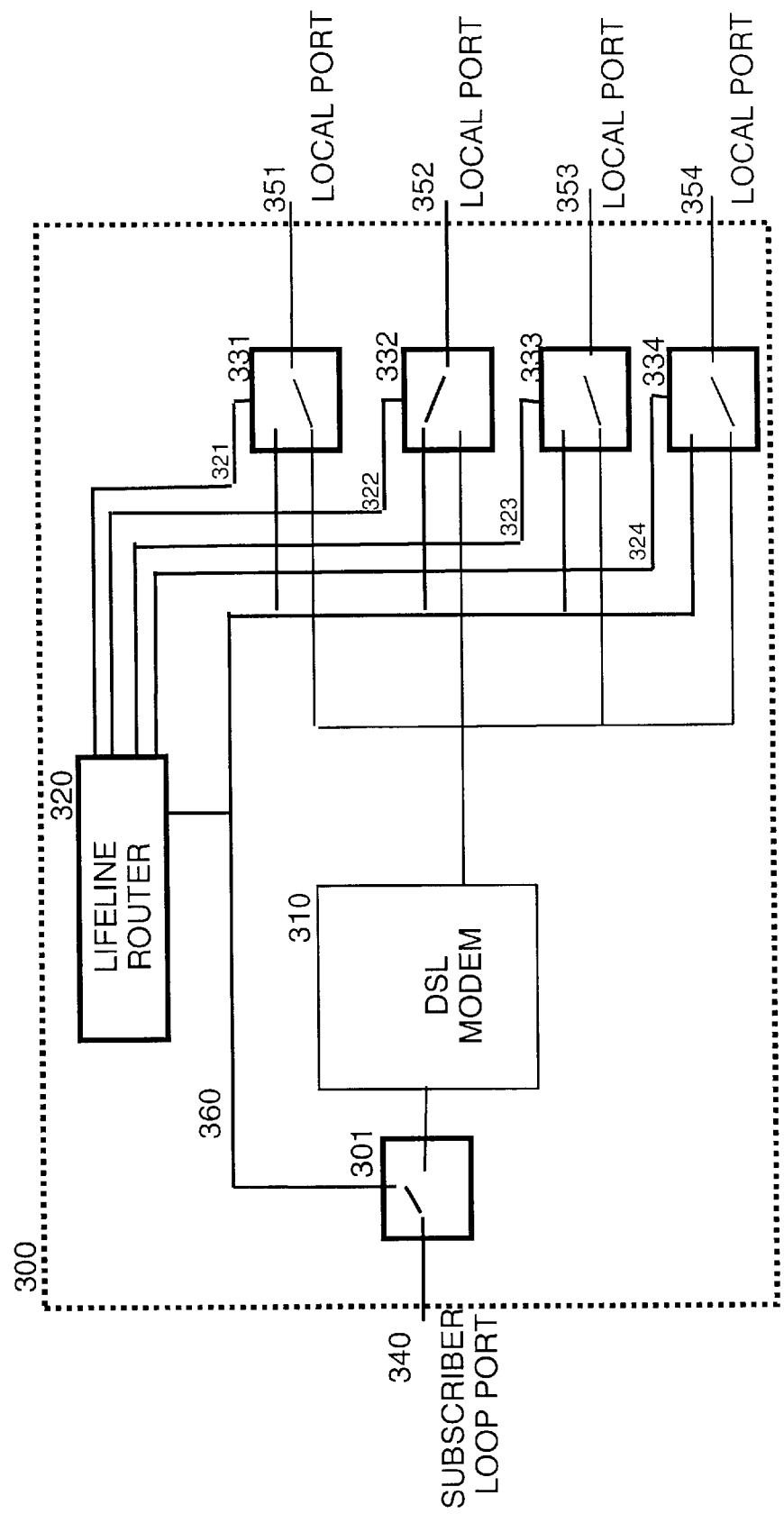
Figure 5:
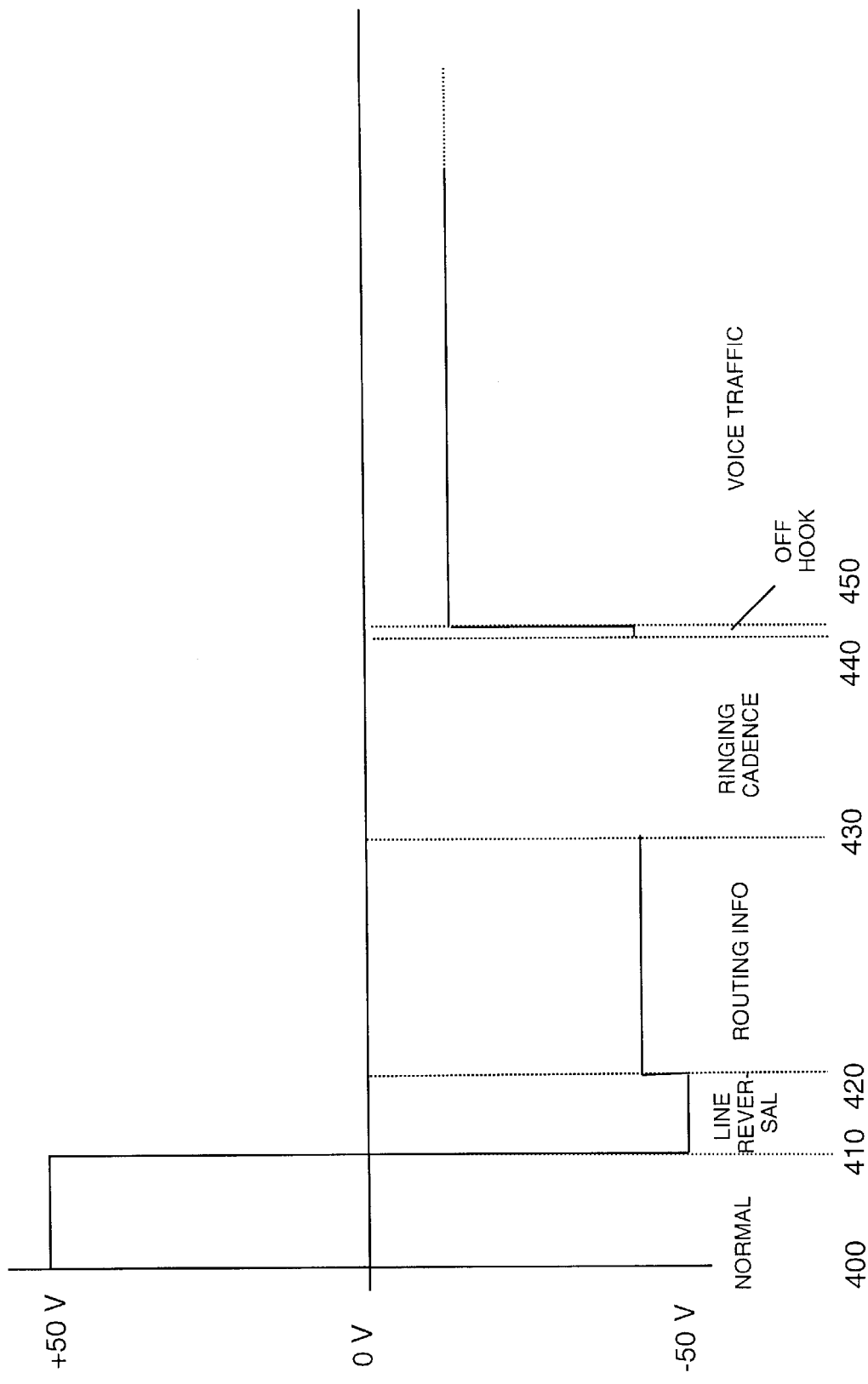
FIG. 5 shows a example signal sequence from central office to customer premises equipment in accordance with the present invention.

Referring now to FIGS. 4 and 5 an incoming call from the LTE is indicated by receipt of a signal at the subscriber loop port 340. When in life line mode this is switched to the direct connection 360 to the local port, and this can be monitored by the life line router 320. In addition to indicating the specific local port to which the call is to be directed, the signal may also include a prefix used to signal an impending indication redirection, and which is used to activate the lifeline router.

The method effectively reverses the normal direction of the signalling. The LTE linecard uses some form of signalling method (e.g. line reversal, DTMF, V.23) to send a routing signal which is used by the lifeline router 320 to route the connection to the outlet required. The method of selecting the required outlet is to disable the other outlets.

Considering the method in detail, there are a number of ways of signalling between the Central Office and a CPE. Generally some form of line voltage modulation can be used, with the most extreme being line reversal. Alternatively, a signal such as used for DTMF as used in telephones, or V.23 as used in CLI could be imposed on the line voltage.

Since the lifeline outer 320 will be in use when the modem has lost local power and is in lifeline mode, power to run the circuitry will need to be available from the line 320. A line reversal could also be used to signal an impending redirection signal. A line reversal 410 could be used to turn on the detection circuitry and associated switching, thus enabling more power to be taken from the line to drive that circuitry. Without this facility, the power drawn might be sufficient to be interpreted as an "off hook" condition. The optimum method will be dictated by the price of available circuitry to achieve the switching, together with its power consumption.

Considering now an example signal sequence received at the subscriber loop port 340, a normal "on hook" line voltage 400 of for example plus 50volts, is applied to the line. Line reversal 410 gives an initial indication that incoming call routing information is imminent and that the lifeline router should be activated. Line reversal is followed shortly thereafter by the beginning 420 of transfer of routing information which indicates the local port to which the incoming call is to be directed. This is used by the lifeline router to selectively couple the corresponding local to the subscriber loop port, decoupling all other local ports. The routing information is followed 430 by receipt of the ringing cadence which is directed only to the local port indicated by the routing information. On detection 440 of a telephone connected to the designated local port going off-hook, the line voltage drops 450 to that normally associated with voice traffic for the duration of the call.

As an example of transmission of routing information, an example of DTMF redirection signalling is described. In this case a total of 16 numbers are available. The output from the DTMF detector is converted into a 4 bit parallel format so that the numbers: 7 (0111), 11 (1011), 13 (1101), and 15 (1110) will present a "one" at all but one of four output port. These are then be used to activate the four normally closed relays 351–4 in series with each corresponding telephone port 351–4. In this way, the lines not being called are disabled whilst the called line is left in its normally closed state.

FIG. 4 shows an arrangement in which switch 332 remains closed, whilst switches 331, 333–4 are opened, thereby directing the following ringing cadence to telephone port 352 only.

On termination of the call, the line voltage will return. This will be used to signal the withdrawal of power to all relays, thus reconnecting all outlets and allowing access to the line for outgoing calls to all telephones.

Figure 6:
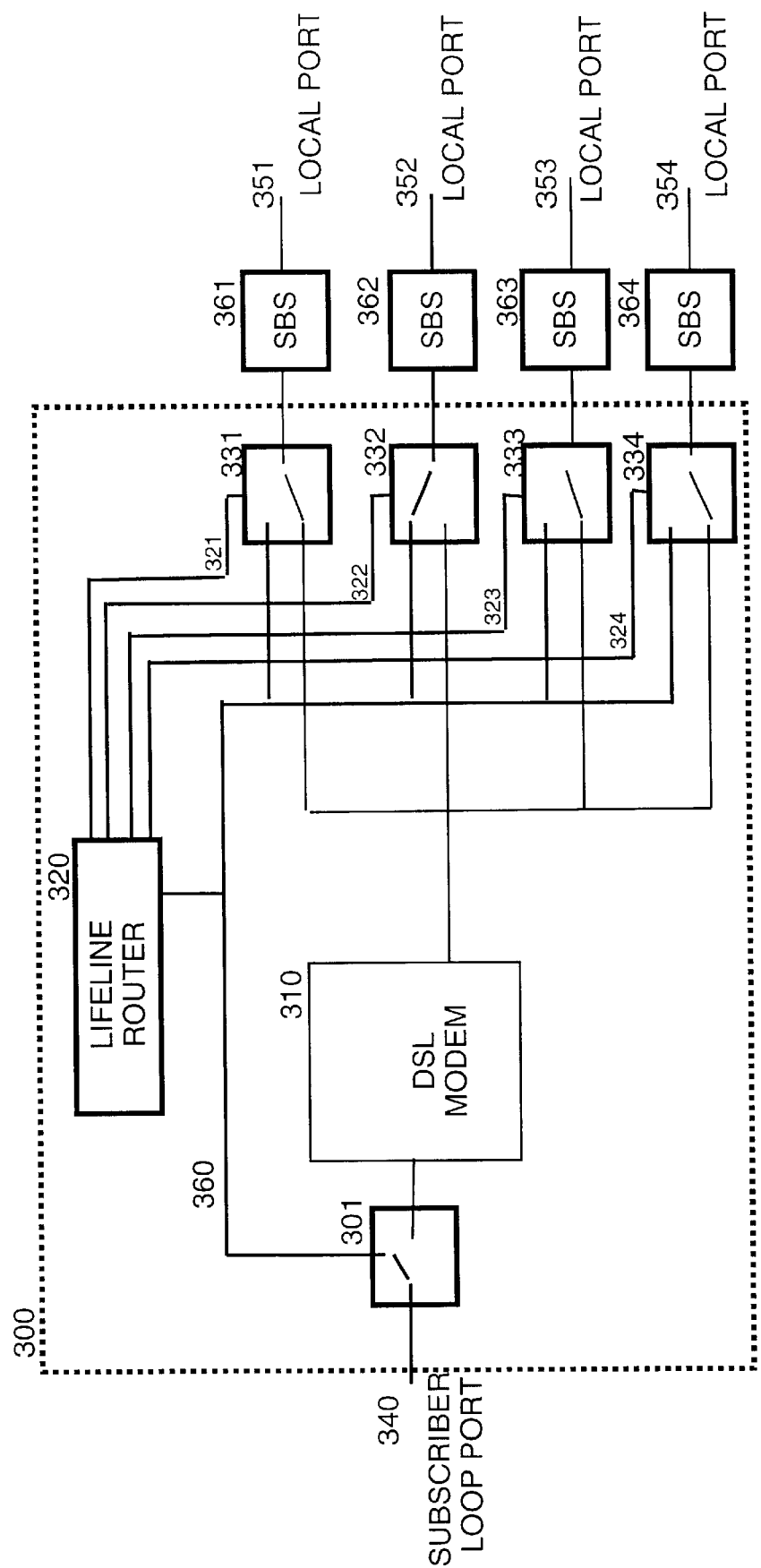
FIG. 6 shows a further embodiment of CPE similar to FIG. 3, but with four added bi-directional switches.

Referring now to FIG. 6, there is shown a further embodiment of CPE in accordance with the present invention similar to that shown in FIG. 3, but with the addition of four bi-directional switches 361 to 364. One of these bi-directional switches is coupled between each of switches 331 to 334 and their respective local ports 351 to 354.

A bi-directional switch is a semi-conducting device, which has high impedance when the voltage across it is below a certain threshold, but transitions to a low impedance when the voltage across it rises above that threshold. It also maintains the low impedance while the threshold level of current is being passed. Such devices are available as integrated circuits, or they can be made from back-to-back silicon controlled rectifiers, where the gates are connected together.

One of these devices is coupled in series with each local POTS port. Each of these switches therefore has line voltage on one side and a telephony device connected via the local port on the other. While all telephones are "on hook" and not loading the line, all the switches are in their high impedance state. As soon as one of the telephony goes "off hook", the voltage on the telephony device side of that switch drops and the switch transitions to a low impedance and remains so as long as that telephony device is drawing current. The voltage on the line side also drops so that, were another phone to go "off hook", the voltage across that switch would now not be sufficient to cause the switch to transition to a low impedance. This ensures the privacy of the telephone in use.

The ringing voltage, being greater than the threshold voltage of bi-directional switches, passes through the switches and thus, in the absence of the local call redirection being enabled, is able to cause all the telephony devices to ring so as to indicate an incoming call. Distinct cadences could be sent from the central office to indicate that a call was for a particular CPE local port.

Where the use of local call redirection by means of lifeline router is employed in conjunction with the bi-directional switches, the combined arrangement ensures that ringing can be temporarily suppressed at one or more local ports, and once the device has gone "off hook" to accept the incoming call, then no devices on any other local ports can interfere with the call in progress. This ensures that the normal user expectation of privacy is maintained even during lifeline mode.

Whilst the use of bi-directional switches to provide privacy in this way is described in the context of lifeline services for a VoDSL lifeline service, its application is not restricted to that context. The use of such devices to achieve this effect is equally applicable in any conventional POTS arrangement in which a single twisted pair connection is coupled to multiple local ports (e.g. multiple extensions all identified by the same dial number).

Any range or device value given herein may be extended or altered without losing the effect sought, as will be apparent to the skilled person for an understanding of the teachings herein.

What is claimed is:

1. Customer premises equipment arrangement for a telecommunications subscriber, the arrangement comprising a subscriber loop port; a plurality of switchable local subscriber ports; and a router circuit; wherein each of said plurality of local subscriber ports is switchably connectable in parallel to said subscriber loop port and wherein said router is arranged to monitor signals received at said subscriber loop port and, in response to a fault condition identified from said signals, to selectively disconnect at least one of said local subscriber ports.

2. Customer premises equipment as claimed in claim 1, wherein said fault condition comprises a loss of electrical power.

3. Customer premises equipment as claimed in claim 2, and arranged to route every voice call to a selected one of said local port under said fault conditions.

4. Customer premises equipment as claimed in claim 3, where each said local port is coupled to a two pole switch whereby the port may be reallocated to carry said voice call.

5. Customer premises equipment as claimed in claim 4, and arranged to maintain a voice call in progress on termination of said fault condition and reversion to normal operation.

6. Customer premises equipment as claimed in claim 5, wherein each said local port is found via a silicon bistable switch whereby use of any one local port causes a reduction of line voltage preventing use of any other local port.

7. Customer premises equipment according to claim 1 arranged in normal operation to receive and transmit digitally modulated signals at the subscriber loop port and in operation during the fault condition to receive and transmit analogue voice signals.

8. Customer premises equipment according to claim 7 wherein said fault condition comprises a loss of electrical power.

9. Customer premises equipment according to claim 7 wherein said digitally modulated signals comprise digitally modulated voice signals.

10. Customer premises equipment arrangement for a digital subscriber line telecommunications subscriber and adapted to provide a lifeline voice service under a fault condition, the arrangement comprising a subscriber loop port whereby the arrangement may be coupled to the subscriber loop; a plurality of switchable local subscriber ports each providing access to a respective telephone instrument; and a router circuit whereby, under normal conditions, voice calls may be routed each to a respective loop port; wherein each of said plurality of local subscriber ports is switchably connectable in parallel to said subscriber loop port and wherein said router is arranged to monitor signals received at said subscriber loop port and to selectively provide and maintain voice access to one said loop port under a said fault condition.

11. A method of operating a customer premises equipment arrangement comprising a subscriber loop port coupled with a subscriber loop to a line termination equipment and having a plurality of local subscriber ports each connectable to a telephone instrument so as to provide a voice over digital subscriber line service to each said telephone instrument, the method comprising routing incoming voice calls each to a respective local point determined from signalling associated with that call, and, under a fault condition in each customer premises equipment arrangement, routing an incoming voice call to a selected one of said local ports and inhibiting further incoming calls while that call is in progress.

12. A method as claimed in claim 8, wherein said fault condition comprises a loss of electrical power supply to said customer premises equipment arrangement.

\* \* \* \* \*